3,090,293
SYSTEM FOR HOT-FILLING WITH CARBON DIOXIDE CONTAINING DRINKS
Karl Plock, Dortmund-Lucklemberg, Karl Quest, Dortmund-Korne, and Karl-Heinz Rusack, Dortmund-Kirchhorde, Germany, assignors to Bruno Kaiser, Hamburg, and Emil Pauls, Hamburg-Eidelstedt, both of Germany
Filed July 7, 1958, Ser. No. 746,903
Claims priority, application Germany July 6, 1957
7 Claims. (Cl. 99—275)

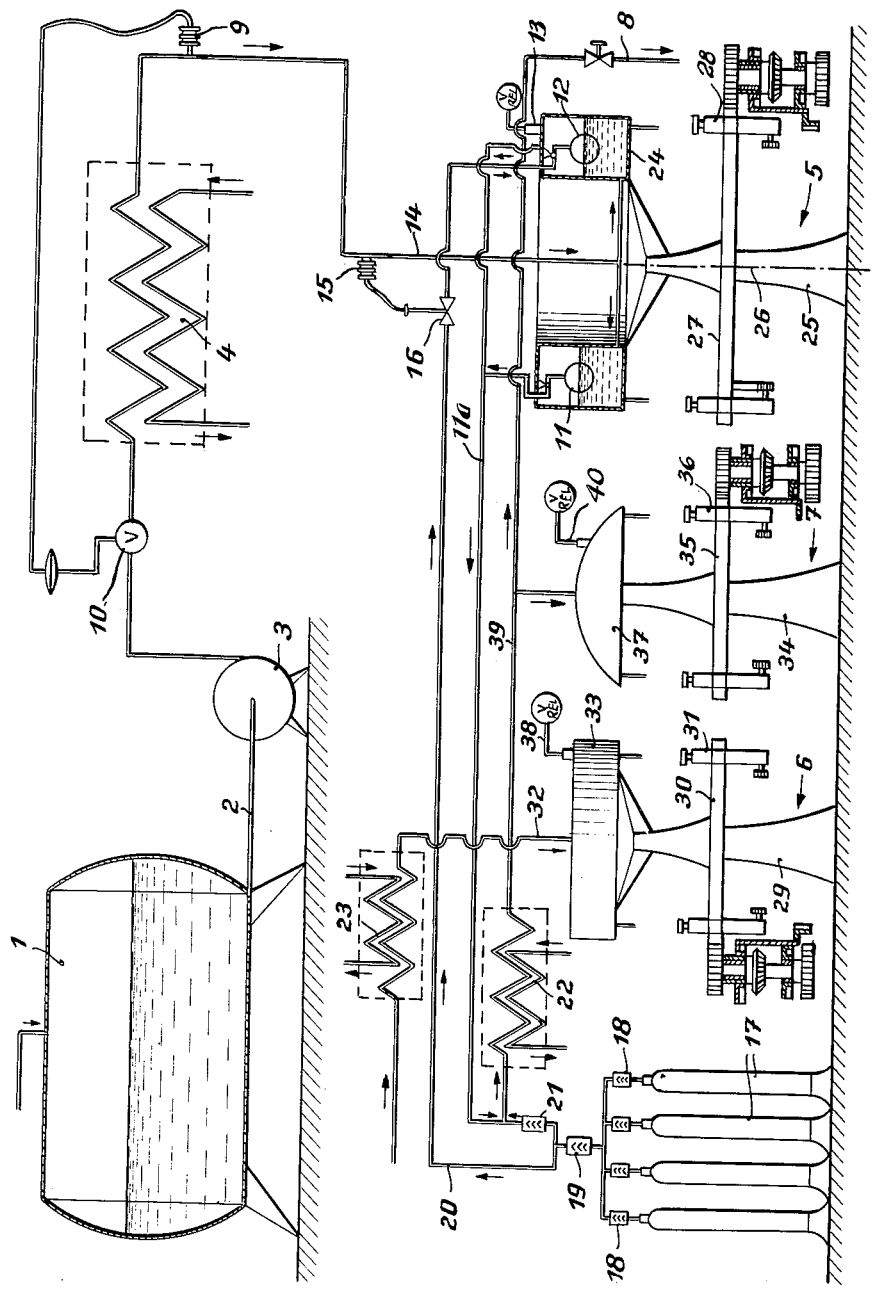

The specification and claims of the pending U.S. patent application Serial No. 570,770, filed March 12, 1956 and assigned to one of the assignees of the present application, now Patent No. 2,897,082, issued July 2, 1959, are directed to a method for hot-filling with carbon-dioxide containing drinks in which the drink to be filled is held until filling under excess pressure. The plant for carrying out this method consists of a heater for the drink and a filling machine with connecting ducts and a bottle cleaning machine with bottle conveying apparatus for conveying to the filling machine.

With the present invention, the drink need not be stored in a pressure-controlled buffer or bottling tank from which it can be led to a filling machine without any further treatment but it can be drawn off from a storing tank or an intermediate tank connected after the filter.

According to this invention it is proposed that the drink be conveyed by means of a high pressure pump in the circuit through a heater and the ducts directly into the filler with a pressure, which in the filler exceeds the saturation pressure of carbon dioxide appropriate to the filling temperature.

According to the invention the plant for carrying out this method is equipped with a pressure difference feeler arranged after the heater which on an alteration of pressure controls an inlet valve for the drink to be supplied, the inlet member being arranged before the heater.

According to the invention a further pressure difference feeler is arranged before the filling machine in the plant of the invention, which closes a carbon dioxide shut-off valve in the supply if there is an excessive pressure increase in the liquid inlet line leading to the filling machine.

It is also relevant to the invention that the carbon dioxide discharged from the filling machine on a drop of the liquid level or on an increasing pressure is added by a tube to the carbon dioxide flowing to a carbon dioxide prefiller or an after-gasser.

The carbon dioxide flowing to the carbon dioxide prefiller or the after-gasser is heater to the filling temperature.

It is further a part of the invention that the heated bottles coming from the cleaning machine are put under filling pressure on the way to the filling machine by hot air. For putting the bottles under pressure a rotating machine is advantageously used.

It is already known to hold carbon dioxide containing drinks, in particular, beer, in a sterilization apparatus in which heating and subsequent cooling of the drink takes place until the drink is discharged from the apparatus under pressure which is always above the carbon dioxide saturation pressure. This is simply effected in such an apparatus, because the sections following the heating section can be so arranged that the resistance to flow effects a depression of the pressure to the outlet of the apparatus to the pressure necessary at this point. In contrast thereto is the necessity of having a heater in the plant for hot-filling which includes no cooling section. The pressure applied to the drink and proportioned to the heating temperature must also be maintained in the filler. The filler is therefore constructed to take this pressure. Because a pressure must be introduced in connection with the filling, the removal of the bottles from the filling element without the temperature at the same time being depressed correspondingly would at first indicate that the drink might suffer harm. It has however been shown that this is not the case.

The regulating apparatus according to the invention built into such a plant secures a continual operation of the method. In particular this regulation permits a buffer tank to be omitted.

The drink cannot be exposed to the air at the high temperature in order to prevent oxidisation phenomena. When the filling method is practiced, however, any substantial liberation of carbon dioxide will only occur when the container is finally opened by the consumer. The heating of the carbon dioxide and the putting of the bottles under a preliminary pressure serves to reduce to the smallest possible degree the breaking of bottles in the filling machine.

In the drawings an illustrative embodiment of a plant for carrying out the method according to the invention is schematically shown.

The drink to be filled is stored in a tank 1 at a temperature of 32–39° F. and under a pressure of for example 21 lbs./sq. inch. The arrangement of a horizontal tank 1 is recommended to allow the drink to flow out of the tank 1 under the steadiest possible pressure. The empty space is advantageously filled with carbon dioxide or with air.

The outlet duct 2 from the tank 1 leads to a high-pressure pump 3 which supplies the drink through a heater 4. From the heater 4 the drink flows out into the liquid container 24 of the filler 5.

A counter pressure filler 5 consists in a known manner of a stationary column 25 with reference to which a table 27 with the bottle supports 28 and the liquid container 24 with the filling elements represented by filling tubes associated therewith are arranged for rotation about an axis 26, conventional means (not shown) being provided for permitting relative movement of the bottles and fillers toward and away from each other as required.

The unfilled bottles are heated in a cleaning machine not shown and are conveyed to a bottle-pressurizer designated generally by 6, in which they are filled with gas under pressure, in particular with air under pressure, which is supplied through a tube 32, conventional means (not shown) being provided for permitting relative movement of the bottles and fillers toward and away from each other as required. The bottle-pressurizer 6 has the function of placing the bottles under a high gas pressure equivalent to the filler pressure before the filling process in order in this way to eliminate any bottles which cannot stand up to this pressure. In practice the bottle-pressurizer 6 comprises a simplified counter-pressure filler, in that the bottle-pressurizer is built basically in the same way as a counter-pressure filler with the exception that all the parts connected with liquid in a counter-pressure filler are omitted. The bottle-pressurizer thus has a stationary column 29 whilst a table 30 with the bottle supports 31 and a gas container 33 with the filling elements associated therewith represented by filling tubes rotates. The gas container 33 is supplied with the hot air under pressure through the duct 32. 38 designates a safety valve.

Following this the bottles become filled with carbon dioxide standing under slight excess pressure in a prefiller, which is generally designated with 7. A prefiller of this kind is known and is described for example in U.S. Patent No. 2,202,033. It comprises mainly a stationary column 34 with reference to which a work table 35 with bottle supports 36 carried thereby is rotatably arranged. A gas container 37 which is supplied with the carbon dioxide under slight excess pressure through the pipe 39 is provided with a safety valve 40 and with filling elements represented by filling tubes, conventional means (not shown) being provided for permitting relative movement of the bottles and fillers toward and away from each other as required. In the prefiller the bottles are filled with carbon dioxide whereby the air in the bottles is flushed out.

From the prefiller the bottles go to the counter filler 5 where they are filled in a known way with beer.

An after-gasser 8 can be connected with the counter-pressure filler 5. The after-gasser has the function of filling the empty spaces in the necks of the filled bottles with carbon dioxide under much reduced pressure. If however the space in the bottle necks is small the use of this kind of after-gasser is unnecessary.

In the heater 4 the drink is heated for example to 70° C. The heating takes place by water of slightly higher temperature. If the super-atmospheric pressure after the heater is to amount, for example, to about 114 lbs./sq. inch, the heater 4 has a flow resistance of 14 lbs./sq. inch, a control valve 10 (provided before the heater in the drink supply line) a resistance of 7 lbs./sq. inch, and assuming that the liquid leaves the tank 1 with an excess pressure of 21 lbs./sq. inch, the high pressure pump 3 must provide a supply pressure of about 114 lbs./sq. inch to attain the desired pressure after the heater. Therefore, a pressure difference feeler 9 is built into the drink supply line after the heater which at a pressure difference of 1.4 lbs./sq. inch from the proposed pressure acts on control valve 10. Control valve 10 controls the discharge of liquid from pump 3 to heater 4 so as to reduce a dangerously high pressure which might be built up on the exit side of heater 4, as sensed by sensing device 9.

The filler 5 which should fill at super-atmospheric pressure of 114 lbs./sq. inch is equipped with two float valves 11, 12. The one float valve 11 discharges the carbon dioxide out of container 24 on a drop of the liquid-level in order to permit a supply flow of the liquid. The second float valve 12 controls the inflow of the carbon dioxide which is under super-atmospheric pressure of for example between 142 and 172 lbs./sq. inch. This great difference between the filling and carbon dioxide inlet pressures is necessary in order to make up with safety for all the pressure losses due to cracked bottles, leaks and the like. In other words, float valves 11 and 12 together regulate the liquid level in container 24 so as to be substantially constant. If the level drops, float valve 11 will open to discharge carbon dioxide from container 24, the lowered pressure thus permitting liquid to flow through pipe 14 into container 24 to replenish the liquid therein. Should the liquid level get too high, float valve 12 will open, admitting carbon dioxide to container 24, the increased pressure in the container counteracting the liquid inflow from pipe 14. Should substantial pressure losses occur in container 24 due to cracked bottles, leaks and the like, the relatively high pressure in the carbon dioxide inlet pipe to container 24 will be sufficient to quickly replenish such losses without an undue time delay. Moreover on the liquid container of the filler 5 an excess pressure valve 13 is arranged to work at 118 lbs./sq. inch in excess of atmosphere pressure. In the pipe 14 for the drink a pressure difference feeler 15 is arranged which closes a shut-off valve 16 in the carbon dioxide inlet if the pressure in the drink inlet pipe 14 rises to more than 116 lbs./sq. inch.

The carbon dioxide is led to the filler 5 from a plurality of carbon dioxide bottles 17 which are connected with the carbon dioxide pipe 20 through pressure reducing valves 18, 19 set at 142–172 lbs./sq. inch. Part of the carbon dioxide is passed through a further reducing valve 21 to emerge at a super-atmospheric pressure of 4.3 lbs./sq. inch and supplies at this pressure the prefiller 7 and after-gasser 8. The carbon dioxide stream is brought to the filling temperature in a heat exchanger 22 by hot water. The carbon dioxide released from container 24 by float valve 11 when the liquid level drops will be returned through a line 11a to heat exchanger 22.

A further heat exchanger 23 serves to heat the air for the pressurizing of the bottles.

The pressure difference feeler 9 after the heater 4 serves to prevent the further discharge of liquid on increase of pressure. This pressure increase can take place when for example in consequence of a stoppage in the filling operation or the like, the liquid no longer leaves filler 5. The drink then remains stationary in the heater 4 without a substantial temperature rise taking place because of the small temperature difference. The second pressure feeler 15 in the duct 14 between the heater 4 and the filler 5 secures the filler 5 against higher pressures from the carbon dioxide duct 20 in case no liquid is taken from the filler 5 and the float valve 12 is opened by the high liquid level. The effect of these measures is furthermore to prevent the loss of any carbon dioxide. The safety valve 13 arranged on the filler is somewhat higher in its pressure adjustment than the operating pressure for the feeler of the carbon dioxide shut-off valve 16.

The following description serves for further explanation of the invention:

Normally, if the beer is cold-filled it is fed for example by means of a pump through a plate preheater for the purpose of sterilization. Directly after the plate preheater a plate cooler is provided from which the now again cool beer is pumped to the filling tank by the same pump. The beer remains standing here for about a day in order to stabilize and then is conducted to the counter-pressure filler by the effect of the pressure charging the filling tank. The filling tank is either under the pressure of compressed air or under a similar pressure of carbon dioxide.

Only an unobstructed pipe or conduit extends between the filling tank and the counter-pressure filler so that there is negligible flow resistance and pressure drop in this conduit regardless of the rate of flow. Thus, by regulating the pressure in the filling tank, the pressure of the beer entering the counter-pressure filler container may be precisely controlled. This pressure may of course not exceed that of the filling tank.

In such conventional cold-filling apparatus, the counter-pressure filler is, moreover, provided with flow valves similar to those indicated at 11 and 12 in the illustrated embodiment of the invention. These valves regulate and maintain a constant liquid level in the counter-pressure filler, the liquid pressure in the counter-pressure filler equaling that of the carbon dioxide in the upper portion of the container. By virtue of the fact that, as just described, the pressure of the liquid entering the counter-pressure filler may be precisely controlled by controlling the pressure in the filling tank, the pressure of the beer in the counter-pressure filler can be easily prevented from reaching the height at which the carbon dioxide safety valve would open. It is thus possible to maintain a satisfactory operation merely by means of the two floats.

When a hot-filling method is employed, however, such as that described in the aforementioned copending Patent 2,897,082, this precise control of the liquid entering the counter-pressure filler by controlling the pressure in the filling tank is no longer available. In hot-filling, the pump supplies liquid to the plate heaters and the liquid flows from the heaters directly into the counter-pressure filler. The flow resistance of the plate heaters is substantially greater than that of an unobstructed pipe or conduit, and is dependent upon the flow volume and flow velocity. Thus, assuming a constant pump pressure output, a reduction or stoppage in the rate of flow would cause a decrease in the pressure drop through the plate heater, resulting in a much higher delivery pressure to the counter-pressure filler container. This pressure could easily become so high that the carbon dioxide safety valve would open and continuously exhaust carbon dioxide. Even more important than the loss of carbon dioxide in such a case would be a disturbance to the beer or other beverage in the counter-pressure filler.

The invention overcomes this problem in hot-filling operations by providing a pump before the heater or sterilizer and a pressure-sensing device in the connection between the heater outlet and the counter-pressure filler container. This sensing device controls a valve disposed between the pump and the heater, and should the sensed pressure become dangerously high, the valve acts to reduce this pressure. Since the portion of the line extending between the sensing device and the counter-pressure filler has negligible flow resistance, a precise pressure control is thus afforded which will function under all flow conditions. In addition, another sensing device is provided in the connection between the plate heater and counter-pressure filler which controls a valve in the carbon dioxide supply line leading to the counter-pressure filler container. This sensing device and valve act as an additional safeguard which will cut off the flow of carbon dioxide should the pressure approach the point at which the safety valve would open. Thus, the invention insures a uniform filling pressure corresponding to the filling temperature of the drink, so that the drink is preserved from harm during storage periods and stoppages such as occur in filling devices.

What we claim is:

1. A system for filling containers adapted to be used for direct consumption with carbon dioxide-containing beverages having, in combination, a pump, a vessel adapted to receive a carbon dioxide-containing beverage, a counter pressure bottle filling machine having a receptacle and a plurality of filling elements, first conduit means for connecting said vessel to the suction side of said pump, second conduit means for connecting the discharge side of said pump to said receptacle including a heat exchanger for heating said beverage to a sterilization temperature for sufficient time to sterilize the same, and regulating means for maintaining the pressure of the beverage in said second conduit means between the saturation pressure of the beverage corresponding to the sterilization temperature and a predetermined pressure above the saturation pressure of said beverage corresponding to said sterilization temperature.

2. A system as claimed in claim 1 in which said regulating means includes a pressure feeler element and a regulating valve member, said pressure feeler element being connected in said second conduit means downstream from said heat exchanger and said regulating valve member being connected in said second conduit means upstream from said pressure feeler element, and means for operatively connecting said pressure feeler element to said regulating valve member to maintain the pressure of said beverage adjacent said pressure feeler element between the saturation pressure of the beverage corresponding to the sterilization temperature and a predetermined pressure above the saturation pressure of said beverage corresponding to said sterilization temperture.

3. A system for filling containers adapted to be used for direct consumption with carbon dioxide-containing beverages having, in combination, a pump, a vessel adapted to receive a carbon dioxide-containing beverage, a counter pressure bottle filling machine having a receptacle and a plurality of filling elements, first conduit means for connecting said vessel to the suction side of said pump, second conduit means for connecting the discharge side of said pump to said receptacle including a heat exchanger for heating said beverage to a sterilization temperature for sufficient time to sterilize the same, regulating means for maintaining the pressure of the beverage in said second conduit means between the saturation pressure of the beverage corresponding to the sterilization temperature and a predetermined pressure above the saturation pressure of said beverage corresponding to said sterilization temperature, said regulating means including a pressure feeler element and a regulating valve member, said pressure feeler element being connected in said second conduit means downstream from said heat exchanger and said regulating valve being connected in said second conduit means upstream from said pressure feeler element, means for operatively connecting said pressure feeler element to said regulating valve member to maintain the pressure of said beverage adjacent said pressure feeler element between the saturation pressure of the beverage corresponding to the sterilization temperature and a predetermined pressure above the saturation pressure of said beverage corresponding to said sterilization temperature, a source of carbon dioxide maintained under a pressure above the pressure of said beverage, carbon dioxide connecting means for connecting said carbon dioxide source to said receptacle, a first float valve arranged in said receptacle for discharging carbon dioxide from said receptacle upon a decrease of a preselected beverage volume therein, and a second float valve arranged in said receptacle for introducing said pressurized carbon dioxide into said receptacle upon an increase of said beverage volume therein.

4. A system for filling containers adapted to be used for direct consumption with carbon dioxide-containing beverages having, in combination, a pump, a vessel adapted to receive a carbon dioxide-containing beverage, a counter pressure bottle filling machine having a receptacle and a plurality of filling elements, first conduit means for connecting said vessel to the suction side of said pump, second conduit means for connecting the discharge side of said pump to said receptacle including a heat exchanger for heating said beverage to a sterilization temperature for sufficient time to sterilize the same, regulating means for maintaining the pressure of the beverage in said second conduit means between the saturation pressure of the beverage corresponding to the sterilization temperature and a predetermined pressure above the saturation pressure of said beverage corresponding to said sterilization temperature, said regulating means including a first pressure feeler element and first regulating valve member, said first pressure feeler element being connected in said second conduit means down-stream from said heat exchanger and said first regulating valve member being connected in said second conduit means upstream from said first pressure feeler element, means for drivably connecting said first pressure feeler element to said first regulating valve member to maintain the pressure of said beverage adjacent said first pressure feeler element between the saturation pressure of the beverage corresponding to the sterilization temperature and a predetermined pressure above the saturation pressure of said beverage corresponding to said sterilization temperature, a source of carbon dioxide being maintained under a pressure above the pressure of said beverage, carbon dioxide connecting means for connecting said carbon dioxide source to said receptacle, a first float valve arranged in said receptacle for discharging carbon dioxide from said receptacle upon a decrease of a preselected beverage volume therein, a second float valve arranged in said receptacle for introducing said pressurized carbon dioxide into said receptacle upon an increase of said beverage volume therein, a second pressure feeler element arranged in said second conduit means between said receptacle and said heat exchanger, a second regulating valve member arranged in said carbon dioxide connecting means, and means for operatively connecting said second pressure feeler element to said second regulating valve member in order to close said second regulating valve member upon an increase of the pressure in said second conduit means above a predetermined value.

5. A system as claimed in claim 4 including additionally a prefiller for filling said containers with carbon dioxide under a relatively small excess pressure before the filling of said containers with said beverage.

6. A system as claimed in claim 4 including additionally a prefiller for filling said containers with heated carbon dioxide under a relatively small excess pressure before the filling of said containers with said beverage.

7. A system for filling containers adapted to be used for direct consumption with carbon dioxide-containing beverages having, in combination, a pump, a vessel adapted to receive a carbon dioxide-containing beverage, a counter pressure bottle filling machine having a receptacle and a plurality of filling elements, first conduit means for connecting said vessel to the suction side of said pump, second conduit means for connecting the discharge side of said pump to said receptacle including a heat exchanger for heating said beverage to a sterilization temperature for sufficient time to sterilize the same, a pressure feeler element and a regulating valve member, said pressure feeler element being connected in said second conduit means downstream from said heat exchanger and said regulating valve member being connected in said second conduit means between said pump and said heat exchanger, and means for operatively connecting said pressure feeler element to said regulating valve member to maintain the pressure of said beverage adjacent said pressure feeler element between the saturation pressure of said beverage corresponding to said sterilization temperature and a predetermined pressure which is above the saturation pressure of said beverage corresponding to said sterilization temperature.

References Cited in the file of this patent

UNITED STATES PATENTS

| | | |
|---|---|---|
| 2,071,990 | Tiger | Feb. 23, 1937 |
| 2,401,131 | Bensel | May 28, 1946 |
| 2,549,575 | Conley | Apr. 17, 1951 |
| 2,575,863 | Clifcorn | Nov. 20, 1951 |
| 2,610,123 | Bruyere | Sept. 19, 1952 |
| 2,665,628 | Boileau et al. | Jan. 12, 1954 |
| 2,672,420 | Jeremiah | Mar. 16, 1954 |
| 2,846,320 | Wittwer | Aug. 5, 1958 |
| 2,887,391 | Jacobsson | May 19, 1959 |
| 2,897,082 | Kaiser | July 2, 1959 |

FOREIGN PATENTS

| | | |
|---|---|---|
| 1,000,709 | Germany | Jan. 10, 1957 |

OTHER REFERENCES

Rusack: Versuchsbericht uber die Erfuhrungen mit dem Heissabfullverfahren fur Bier. Printed in Brauwelt (Ger.) 98 No. 33, Apr. 25, 1958 ed., pp. 593–6.

De Markus: Modern Tendencies in Beer Carbonation, reprinted from April and May 1935 issues of Brewers Journal-Webster Brewer, Chicago, p. 4, col. 3, to p. 5, col. 1.